US007281235B2

(12) United States Patent
Datta et al.

(10) Patent No.: US 7,281,235 B2
(45) Date of Patent: Oct. 9, 2007

(54) COMPUTER CONTROLLED SYSTEM FOR MODULARIZING THE INFORMATION TECHNOLOGY STRUCTURE OF A BUSINESS ENTERPRISE INTO A STRUCTURE OF HOLONIC SELF-CONTAINED MODULES

(75) Inventors: Vic Datta, Oak Hill, VA (US); Ralph Hodgson, Port Ludlow, WA (US); Irene Polikoff, Rye, NY (US); Rahul Saxena, Penfield, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 10/042,483

(22) Filed: Jan. 9, 2002

(65) Prior Publication Data

US 2003/0130860 A1 Jul. 10, 2003

(51) Int. Cl.
*G06F 9/44* (2006.01)

(52) U.S. Cl. ............. 717/104; 717/102; 717/120; 705/1; 705/10

(58) Field of Classification Search ........ 717/164–169, 717/102–120; 725/1; 709/318; 714/38; 700/28; 705/1, 10, 400
See application file for complete search history.

(56) References Cited

U.S. PATENT DOCUMENTS

| | | | |
|---|---|---|---|
| 5,799,293 A | 8/1998 | Kaepp | 706/45 |
| 5,819,092 A | 10/1998 | Ferguson et al. | 395/701 |
| 6,125,351 A | 9/2000 | Kauffman | 705/7 |
| 6,128,624 A | 10/2000 | Papierniak et al. | 707/104 |
| 6,347,253 B1 * | 2/2002 | Fujita et al. | 700/28 |
| 2002/0199182 A1 * | 12/2002 | Whitehead | 725/1 |

(Continued)

OTHER PUBLICATIONS

Holonic Manufacturing scheduling: architecture, cooperation mechanism, and implementation; Ling Gou, Peter B. Luh, Yuji Kyoya; 1998 Elsevier Science B.V Computers in industry 1998, p. 213-231.*

*Primary Examiner*—Meng-Al T. An
*Assistant Examiner*—Mark P. Francis
(74) *Attorney, Agent, or Firm*—J. B. Kraft; David A. Mims, Jr.

(57) ABSTRACT

A system for facilitating the reorganization of the information technology of a business organization into a structure that is modular and, thus, interchangeable between business units within the enterprise, and particularly within World Wide Web enterprises involving several correlated companies.

A computer controlled system is provided for modularizing the information technology structure of a business organization into a structure of interchangeable holonic self-contained modules, with each module performing a set of related functions comprising means for providing a plurality of sets of self-controlling holons, with each holon in each set performing a business capability of the same type as performed by the other holons in its respective set but each set of holons performing a different business capability type than the other sets of holons. A plurality of integration holons are provided, with each integration holon respectively integrating the holons in one of said sets to provide a coordinated overall business capability of one of said different types. The system also provides for modularizing the information technology structure of a business organization so that each integration holon integrates the holons in one of the sets to unitary overall combination business capability holon. Such combined sets of holons may perform a World Wide Web business capability, an internal business organization capability and/or a data processing organization type of capability.

15 Claims, 6 Drawing Sheets

U.S. PATENT DOCUMENTS

2003/0105884 A1* 6/2003 Upton ................ 709/318
2005/0193269 A1* 9/2005 Haswell et al. ........... 714/38
2006/0287783 A1* 12/2006 Walker ................ 701/29

* cited by examiner

COMPUTER CONTROLLED SYSTEM FOR MODULARIZING THE INFORMATION TECHNOLOGY STRUCTURE OF A BUSINESS ENTERPRISE INTO A STRUCTURE OF HOLONIC SELF-CONTAINED MODULES

TECHNICAL FIELD

The present invention relates to the information technology structure of business enterprises including business organizations of such expansive scope that their functions and business processes are interrelated through the Internet or World Wide Web (Web) or like networks. The invention particularly relates to systems for reorganizing the information technology of such business enterprises to achieve the fullest advantages of opportunities offered by the Web.

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web (the terms are used interchangeably herein) related distribution of documents, programs, media and all other data processing entities. The convergence of the electronic entertainment and consumer industries with data processing exponentially accelerated the demand for wide ranging communication distribution channels and the Web or Internet, which had quietly existed for over a generation as a loose academic and government data distribution facility, reached "critical mass" and commenced a period of phenomenal expansion.

As a result of this expansion, extraordinary worldwide communication channels and resources have become available to businesses on a relatively inexpensive basis. This has commenced an era which will forever change how business processes are conducted. Business organizations including business enterprises (the term is used here to define organizations of such scope that many divisions and separate but interrelated companies are involved) are becoming increasingly modular in nature, i.e. with many shared processes and functions. This is, of course, greatly facilitated by the distribution and tracking functions provided by the Web.

Business entities must out source various functions or activities to other enterprise divisions, companies, partners and even contractor or subcontractor organizations. As a result of Internet functions and capabilities, these out source participants may be in different cities or countries.

However, this out sourcing or like collaboration between different organizations and companies requires the sharing of resources, such as business processes and databases. Each out sourcing company often has to make available to one or more of the others, databases, application programs and other resources that the others may need to complete their activity. This gives rise to the obvious need for up to literally hundreds of points of contact between business entities, dependent upon the size of the business enterprise or organization.

In addition, with the development of the Web, virtually all organizations have been driven to perform a substantial portion of their sales, marketing and customer distribution functions over the Web. These activities coupled with the above-described organizational functions have become known as e-Business, and their business organizations known as e-Business enterprises. To deliver value to their customers, companies of all sizes use partners: suppliers, complementary providers, distributors and shippers correlated through the Web.

Many companies and even large enterprises have responded to all of the above changes in the market place environment and needs on a piecemeal basis by adding resources and function as needed within each of their individual business entities or functions without any overall organization-wide overall plan. The business organizations wrestling with the complexities of plugging such individual resources and functions into the business organization or enterprise as needed are seeking information technology-centric protocols to solve many of these problems.

SUMMARY OF THE PRESENT INVENTION

The present invention provides a system for facilitating the reorganization of the information technology of a business organization into a structure that is modular and, thus, interchangeable between business units within the enterprise, and particularly within Web enterprises involving several correlated companies.

The invention involves a computer controlled system for modularizing the information technology structure of a business organization into a structure of interchangeable holonic self-contained modules, with each module performing a set of related functions. The system comprises means for providing a plurality of sets of self-controlling holons, with each holon in each set performing a business capability of the same type as performed by the other holons in its respective set, but each set of holons performing a different business capability type than the other sets of holons. There are also means for providing a plurality of integration holons, with each integration holon respectively integrating the holons in one of the sets to provide a coordinated overall business capability of one of the different types. The system also provides for modularizing the information technology structure of a business organization so that an integration holon integrates the holons in one of the sets to unitary overall combination business capability holons. Such combined sets of holons may perform a Web business capability, an internal business organization capability and/or a data processing organization type of capability.

The holons are modular and may be interchanged to perform their respective capabilities in other information technology structures within the business enterprise. In this respect, the organization structure may involve a holon directory listing of available interchangeable holons and the respective business capability of each of said available holons and means for registering an interchangeable holon in said directory.

The system may also include means for visualizing the modularized information technology structure of the business organization on a display of said computer controlled system.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Before going further into the details of specific embodiments, it will be helpful to understand from a more general perspective the various elements and methods that may be related to the present invention. First, since a major aspect of the present invention is directed to Web distribution and transactions, an understanding of such networks and their operating principles would be helpful. We will not go into great detail in describing the networks to which the present invention is applicable. The present invention is applicable to a global network such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Objects are linked to other objects in the hierarchy through a variety of network server computers. These network servers are the key to network distribution, such as the distribution of Web documents or pages that is used to describe data transmitted over the Web and is intended to include Web pages with displayable text, graphics and programs.

The present invention may be implemented using object oriented programming systems and languages such as C++, COM, OLE or Java. Thus, it should be helpful to generally review the known principles of object oriented programming.

It should be understood by those skilled in the art that object oriented programming techniques involve the definition, creation, use and instruction of "objects". These objects are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements, and its behavior, which can be represented by its methods.

Figure 1:
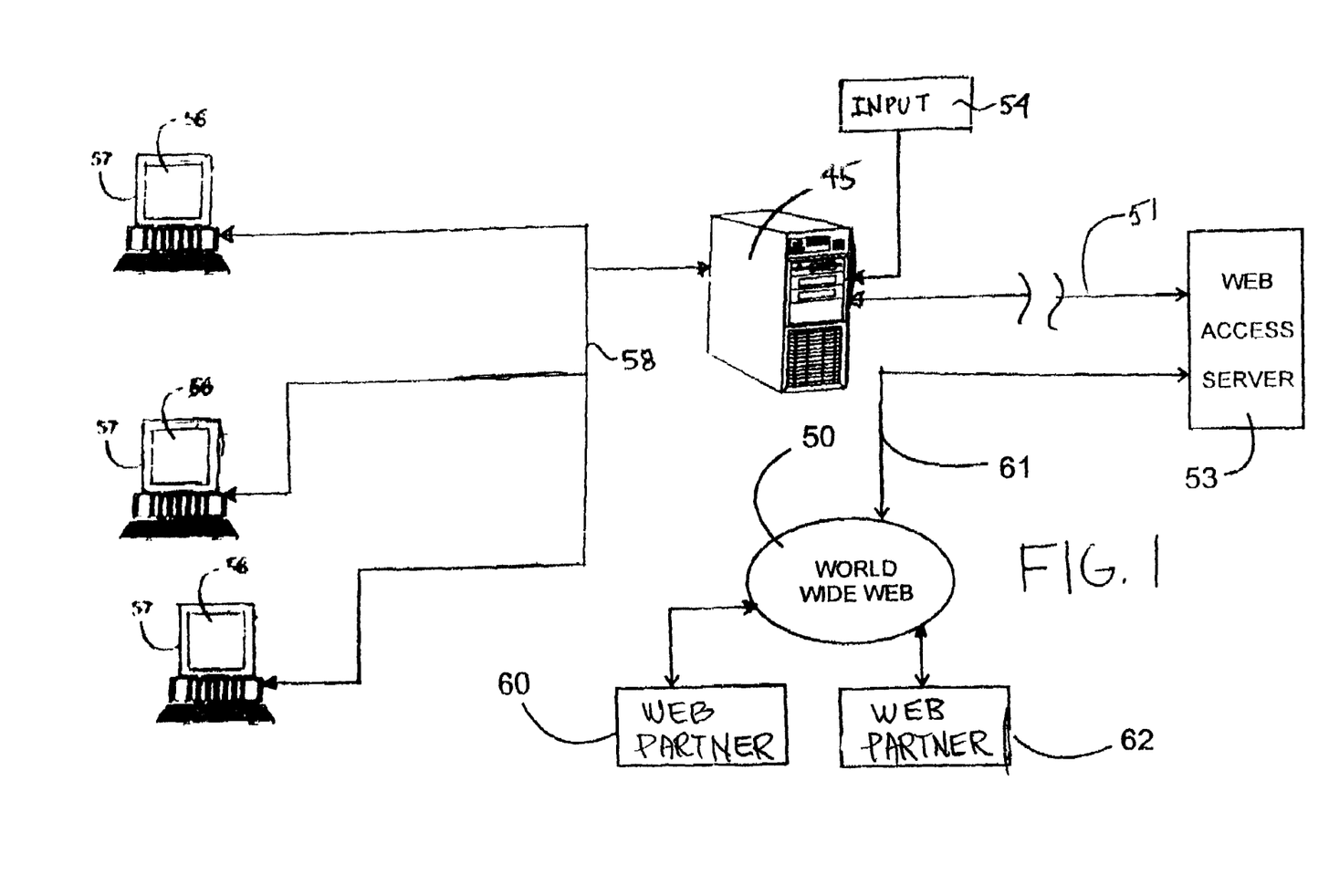
FIG. 1 is a generalized diagrammatic view of a network such as a local business organization network connected through a server computer connected to other business organizations, units or partners through the Web, of which a portion is shown, on which the present invention may be implemented.

Referring now to FIG. 1, there is shown a very generalized diagram of a Web portion on which the present invention may be illustrated. In the examples which follow, we will use the Web as the computer controlled object oriented programming network system used by the business enterprise, the information technology of which is being organized and modularized in accordance with the present invention. A localized business unit is represented by a network 58 made up of a server 45 with appropriate I/O 54 and several local business I/O terminals, each consisting of a display 56 computer 57. These computer I/O terminal 56, 57 may represent the data processing system of a business entity in the unit, e.g. any business function such as marketing, distribution, manufacturing or financial; or the facility of a vendor, contractor or like business partner making a functional contribution to the business unit in the business enterprise. Server 45 is typically connected to the Web 50 via standard Web wired connections through Web server 53 that may be provided by a commercial service provider via connections 61. Reference may be made to the text, *Mastering the Internet*, G. H. Cady et al., published by Sybex Inc., Alameda, Calif., 1996, particularly pp. 136-147, for typical connections between local display stations to the Web 50 via access server 53 through connection 51. Other business units in the business enterprise may be connected through the Web 50 to business unit network 58. In this illustration, the other business units connected via the Web are shown as Web business partners 60 and 62, but these business units may also be in companies related to that of the business units or divisions of the same company.

Figure 2:
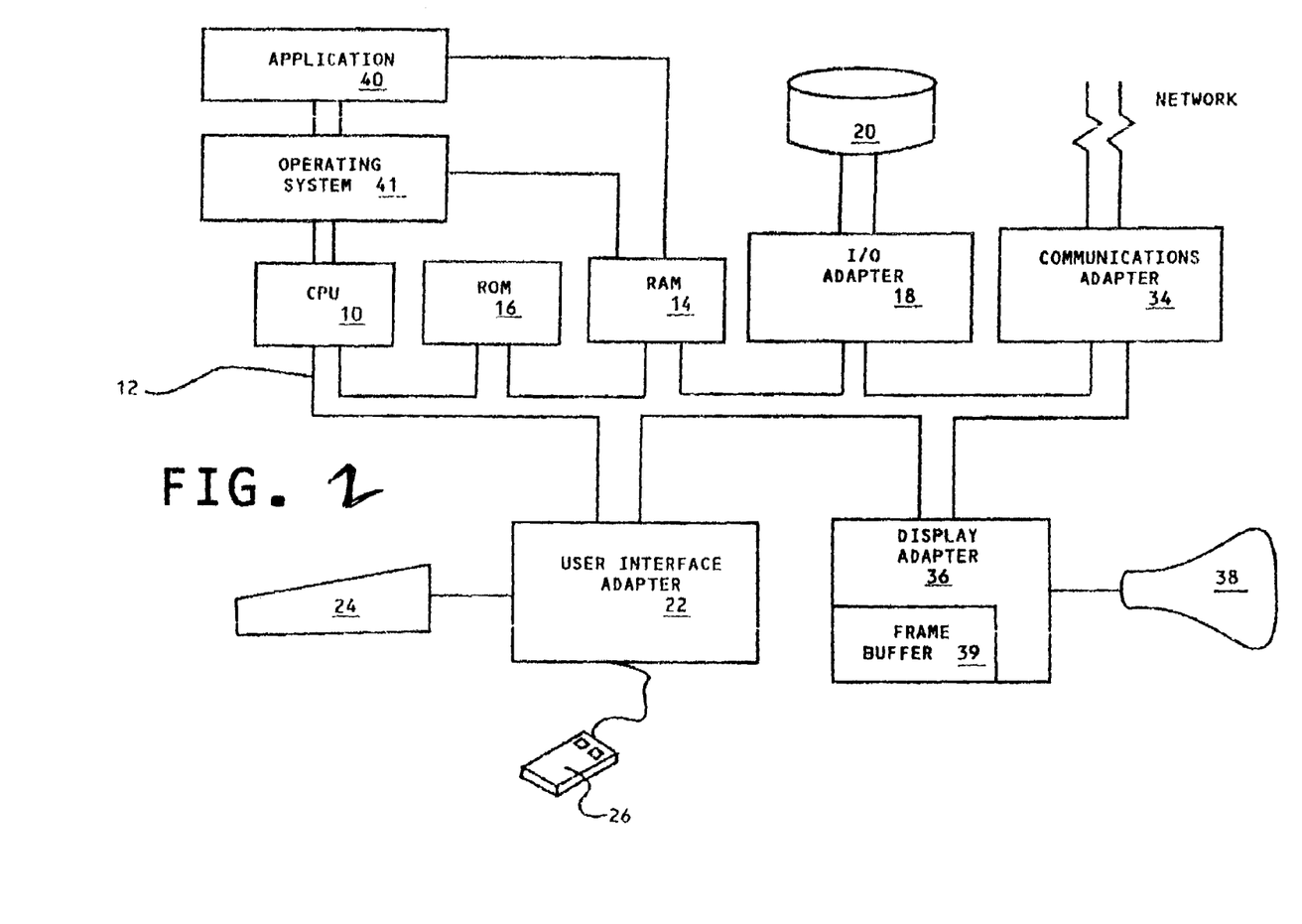
FIG. 2 is a block diagram of a data processing system including a central processing unit and network connections via a communications adapter that is capable of functioning as any of the local business unit computers or the Web or other servers in the network of FIG. 1.

Referring to FIG. 2, a typical data processing unit is shown that may function as the computer display terminals 57 or function as the network server computer 45 (FIG. 1). A central processing unit (CPU) 10, such as one of the PC microprocessors or workstations, e.g. eServer pSeries available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 2. Operating system 41 may be one of the commercially available operating systems such as IBM's AIX or Microsoft's WindowsMe™ or Windows 2000™, as well as UNIX and other IBM AIX operating systems. Application programs 40, controlled by the system, are moved into and out of the main memory Random Access Memory (RAM) 14. These programs include the programs of the present invention in appropriate computers, the functions of which are being modularized in accordance with the present invention. These functions will be described hereinafter. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside network, i.e. the Web. I/O devices are also connected to system bus 12 via user interface adapter 22 and display adapter 36. Keyboard 24 and mouse 26 are all interconnected to bus 12 through user interface adapter 22. It is through such input devices that the user at the client computers may interactively relate to the Web programs of the present invention. Display adapter 36 includes a frame buffer 39, which is a storage device that holds a representation of each pixel on the display screen 38. Images may be stored in frame buffer 39 for display on monitor 38. By using the aforementioned I/O devices, a user is capable of inputting information to the system through the keyboard 24 or mouse 26 and receiving output information from the system via display 38.

Figure 3:
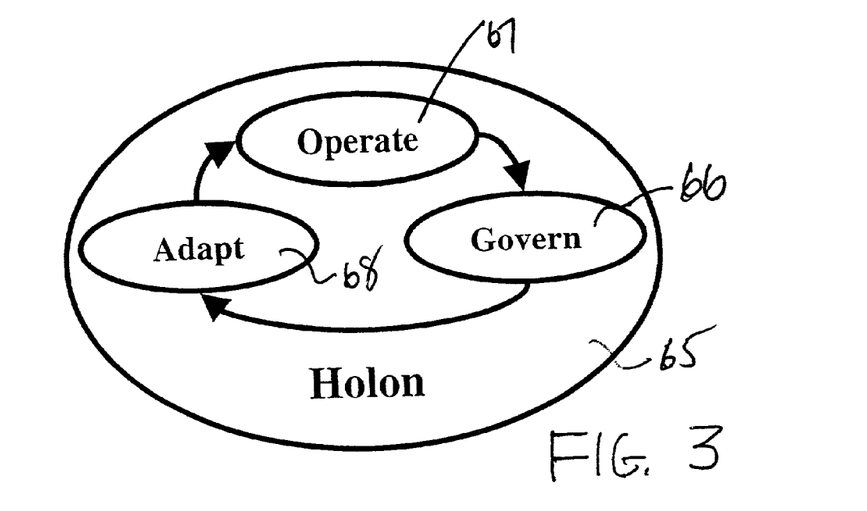
FIG. 3 is a diagrammatic sketch of a holon.

The present invention involves modularizing the information technology structures of business organizations through a combination of interchangeable self-contained holonic modules. For the purpose of functionally orienting the more detailed description of the organization of the information technology into holons that will follow, a self-contained holon is diagrammatically shown in FIG. 3. Holons have been used for years in Holonic Manufacturing Systems. Holons like data processing agents are self-contained self-governing units of an organization like a business unit that are goal oriented. Thus, in the business organization, holons are constructed to be units of operations that are capable of evolving themselves in accordance with their goals. Holons use three general functions that are internal to the holon 65. They operate 67 to fulfill the goals of the holon; they are self governing 66 to the extent that they sense, interpret and decide on whether to change; and responsive to such decisions, they are capable of adapting 68 to change the holon in response to internal or external stimuli. In organizing and responding to information technology, the processing may be automated. Holons interact with each other using human-to-machine, or machine-to-machine interfaces.

In the organization of information technology of business organizations, the holons function as sets of holons of the same business capability type with each set being integrated and controlled by an integration holon. The holons are structured using, for example, the Universal Description, Discovery and Integration (UDDI) system developed and made publicly available through the World Wide Web Consortium (W3C). UDDI developed by a business standards consortium, including IBM, Microsoft and Hewlett-Packard Companies among others, provides a standard platform independent open framework through which the holons created in the practice of the present invention may be integratable into and across business enterprises and units that ascribe to the framework standards for integration established by UDDI. Thus, by using the UDDI protocols, as will be hereinafter described in greater detail, the holonic module combinations of this invention are interchangeable building blocks through which business enterprises may internally or externally organize their business operations. Details of current UDDI protocols are available at the UDDI Web site, as well as through the W3C Web site.

Holons are interchangeable blocks. The design of holonic systems must be open, modular and standardized. That is why the above-mentioned UDDI architecture, standardized through W3C, is applicable to the holonic organization of the present invention. Control of holonic systems depends on communication, automation, self-diagnosis and self-repair. Holonic architecture is usually hierarchical with individual holons performing subordinate and/or supervisory roles. depending on their place in the hierarchy. Each holon is an autonomous block which must cooperate with other blocks to achieve the overall objective. Each holon has its own objectives that sometimes conflict with the objectives of other related holons. There must be negotiation of such conflicts. The effectiveness of the negotiation will have a significant effect on the efficiency of the system. The standardization is primarily interface standardization whereby the interchangeable holons must interface so as to be integrated within the respective frameworks.

Figure 4:
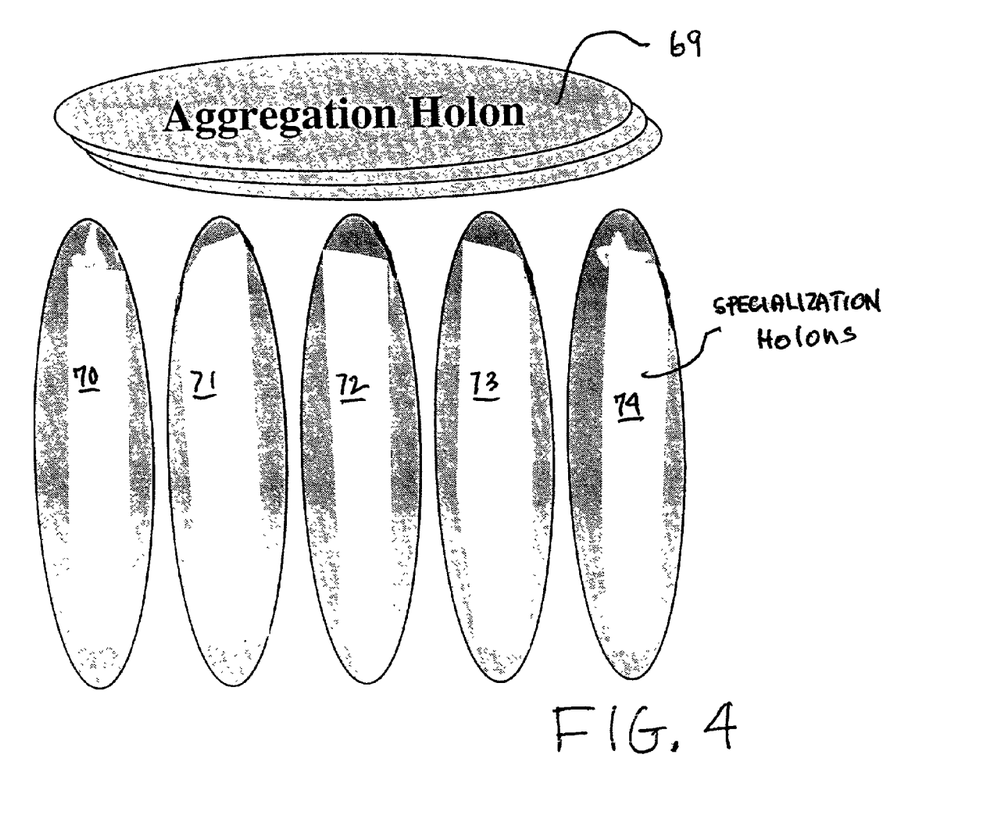
FIG. 4 is a diagrammatic sketch showing the relationship of a set of specialization (business capability) holons integrated through an aggregation (integration) holon.

In light of this background with respect to holonic systems, the holonic system of the present invention will now be considered in greater detail. With reference to FIG. 4, there is illustrated a unit in the holonic system used to modularize the information technology structure of a business organization. Specialization holons 70-74, each perform a specialized business capability of the same type, usually within one operating unit of the business; aggregation holon 69 could be referred to as an integration holon in that it functions to coordinate or integrate the business capabilities of specialization holons 70-74 across different operating units. It should be noted that aggregation holon 69 is represented as a cluster of holons. The reason for the cluster is that any of the specialization holons 70-74 may be joined to a number of aggregation holons. As set forth above, holonic architecture is usually hierarchical with individual holons performing subordinate and or supervisory roles depending on their place in the hierarchy. Each holon is an autonomous block that must cooperate with other blocks to achieve the overall objective. Thus, aggregation holon 69 in the present set up is a combination holon of subordinate holons that performs the above-mentioned coordination function.

Figure 5:
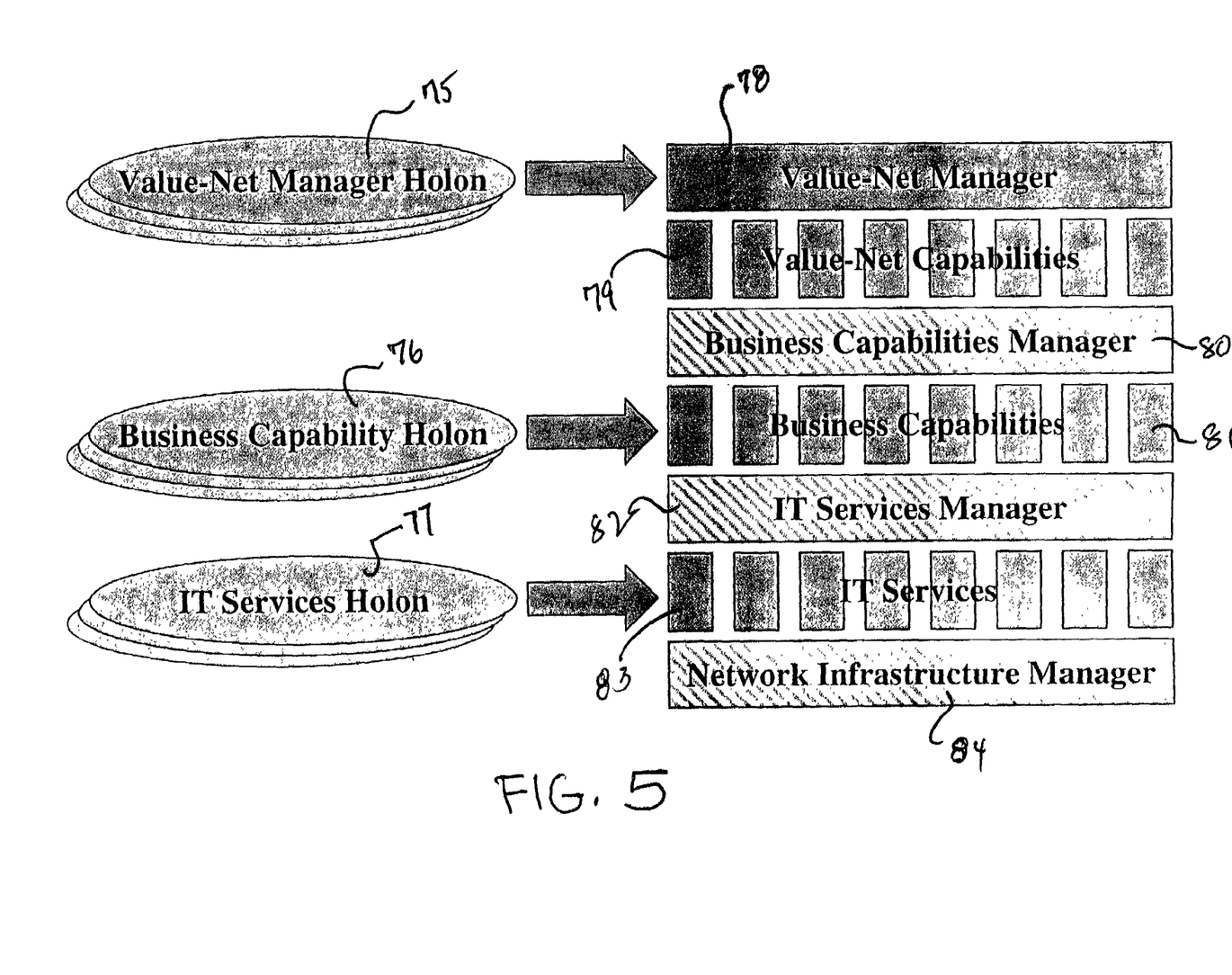
FIG. 5 is a more particularized diagrammatic sketch illustrating the relationship between sets of business capability holons and their respective integration holons in the modular information technology structure of a business organization.

With reference to FIG. 5, the organization format described with respect to FIG. 4 will be applied to the holonic modularization of the information technology of an illustrative business unit. The overall Internet or Web applicable holonic structure will be referred as the Value-Net that is an architecture defining the overall Web capability holonic functions. The holonic structure is made up of three sets of business capabilities: Value-Net Capabilities 79, Business Capabilities 81 and IT Services Capabilities 83; as well as four integrating or coordinating functions: Value-Net Manager 78, Business Capabilities Manager 80, IT Services Manager 82 and Network Infrastructure Manager 84. All seven of these functions will be carried out by holons: the set of Business Capabilities 81 are carried out by a set of corresponding specialization holons 76; the set of IT Services Capabilities 83 are carried out by a set of corresponding specialization holons 77; and the set of Value-Net Capabilities 79 are carried out by a set of corresponding specialization holons that are not shown. Similarly, the Value-Net Manager 78 coordination function is carried out by aggregation holon 75. The Business Capabilities Manager 80, IT Services Manager 82 and Network Infrastructure Manager 84 functions are respectively carried out by aggregation holons that are not shown.

In the illustrative business unit of FIG. 5, Value-Net Manager Holon 75 representative of manager function 78 acts to establish and manage relationships between parties in the network arrangement, as well as setting and monitoring network goals and behaviors. Specialization holons, not shown, representative of net capabilities 79 act to execute capabilities in support of the network functions. A manager or coordination holon, not shown, representative of Business Capabilities Manager function 80 will provide a framework that coordinates the Business Capabilities 81 to enable generation, operation and tracking of interconnections between the business capabilities. Business Capabilities 81 are, in turn, represented by business capability specialization holons 76 that create specific business value or process value creation. A manager or coordination holon, not shown, representative of IT Services Manager function 82 will provide a framework that offers the information technology platform supporting the interaction of humans and machines to enable the IT Services 83. Such IT services are, in turn, represented by and provided by IT services specialization holons 77. Another manager or coordination holon, not shown, represents Network Infrastructure Manager to provide a framework supporting the telecommunications network backbone access to link the network participants and resources.

Figure 6:
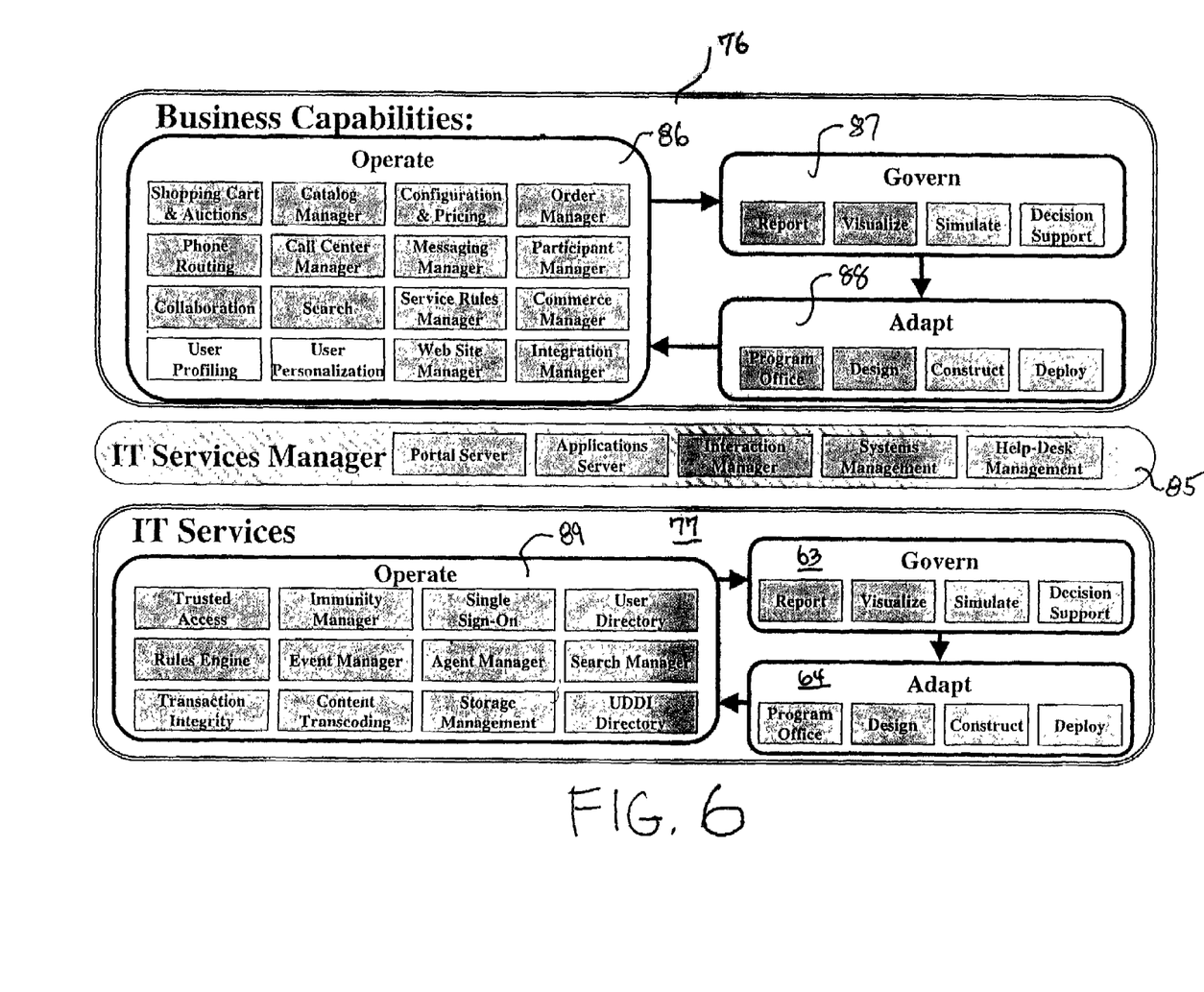
FIG. 6 is a more detailed diagrammatic view of some of the business capability and integration holons of FIG. 5.

Now, with reference to FIG. 6, there will be an elaboration of FIG. 5 in order to detail the functioning of three of the holons of FIG. 5: the organization of a business capabilities holon 76; the organization of another specialization holon, IT services holon 77, as well as a coordination holon 85, not previously shown, for the IT Services Manager function. In the details of business capabilities specialization holon 76 in FIG. 6, there is detailed the internal holon operate 86, govern 87 and adapt 88 functions that were previously just outlined in the illustrative holon of FIG. 3 to show the subordinate functions that must be coordinated to perform the overall holonic functions. Likewise, the details of IT services holon 77 shows the subordinate functions that must be coordinated into order to achieve the operate 89, govern 63 and adapt 64 functions. Also, an IT services coordinating holon 85 is detailed in order to illustrate the subordinate functions that must be combined to carry out the coordination function.

It has been previously mentioned that the organization structure may involve a holon directory listing available interchangeable holons and the respective business capability of each of said available holons and means for registering an interchangeable holon in said directory. For holons conforming to the UDDI standard interface protocols, as described above, the UDDI maintains a UDDI Business Registry which may be accessed on the Web at www.uddi.

In addition, the holonic structure of the business organization may be set up so that the components in the various holons may be displayed in the form shown in FIG. 6 on the displays of the various participating computer display terminals described in FIGS. 1 and 2.

Figure 7:
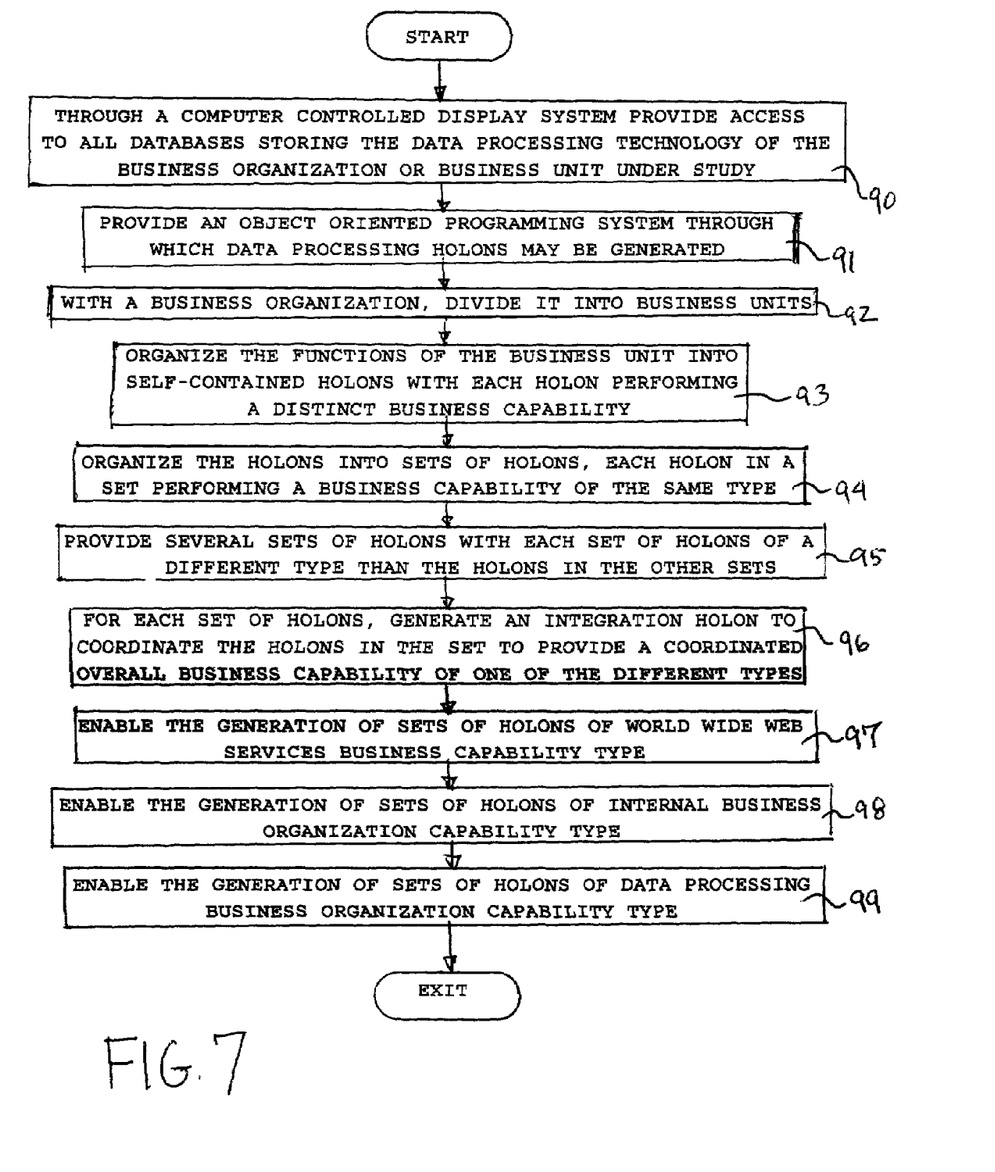
FIG. 7 is an illustrative flowchart describing the setting up of the elements of the system of present invention for modularizing the information technology of a business enterprise through the generation of sets of business capability holons respectively integrated through integration holons.

FIG. 7 is a flowchart showing the development of a process according to the present invention for the modularization of the information technology structure of a business organization into a structure of holonic self-contained modules. Through a computer controlled display system, there is provided access to all databases storing the data processing technology of the business organization or business unit under study, step 90. An object oriented programming system is provided through data processing holons may be generated, step 91. In the study of a business organization, provides for the division of the organization into business units, step 92. Enable the organization of the functions of the business units into self-contained holons with each holon performing a distinct Business Capability, step 93. Enable the organization of the holons into sets of holons with each holon in a set performing a Business Capability of the same type, step 94. Enable the organization of several sets of holons with each set of holons being of a different type than the holons in the other sets, step 95. For each set of holons, provide for the generation of an integration holon to coordinate the holons in the set to provide a coordinated overall Business Capability of one of the different types, step 96. Provide for the generation of sets of holons of Web services business capability type, step 97. Provide for the generation of sets of holons of internal business organization capability type, step 98. Provide for the generation of sets of holons of data processing business organization capability type, step 99.

One of the preferred implementations of the present invention is in application program 40. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled system having processor for modularizing the information technology structure of a business organization into a structure of interchangeable holonic self-contained modules, with each module performing a set of related functions comprising:
   means for providing a plurality of sets of self-controlling holons, each holon in each set performing a business capability of the same type as performed by the other holons in its respective set but each set of holons performing a different business capability type than the other sets of holons and each holon being interchangeable to perform its respective business capabilities in other information technology structures;
   means for providing a plurality of integration holons, each integration holon respectively integrating the holons in one of said sets into a unitary overall business capability holon providing a coordinated overall business capability of one of said different types;
   a holon directory listing available interchangeable holons and the respective business capability of each of said available holons; and
   means for registering an interchangeable holon in said directory.

2. The system for modularizing the information technology structure of a business organization of claim 1 wherein the business capability type performed by one of said sets of holons is World Wide Web services capability.

3. The system for modularizing the information technology structure of a business organization of claim 2 wherein the business capability type performed by another of said sets of holons is of the internal business organization type.

4. The system for modularizing the information technology structure of a business organization of claim 3 wherein the business capability type performed by another of said sets of holons is of the data processing organization type.

5. The system for modularizing the information technology structure of a business organization of claim 4 further including means for visualizing the modularized information technology structure of said business organization on a display of said computer controlled system.

6. In a computer controlled system, a method for modularizing the information technology structure of a business organization into a structure of interchangeable holonic self-contained modules, with each module performing a set of related functions comprising:
   providing a plurality of sets of self-controlling holons, each holon in each set performing a business capability of the same type as performed by the other holons in its respective set but each set of holons performing a different business capability type than the other sets of holons and each holon being interchangeable to perform its respective business capabilities in other information technology structures;

providing a plurality of integration holons, each integration holon respectively integrating the holons in one of said sets into a unitary overall business capability holon providing a coordinated overall business capability of one of said different types;

providing a holon directory listing available interchangeable holons and the respective business capability of each of said available holons; and registering an interchangeable holon in said directory.

7. The method for modularizing the information technology structure of a business organization of claim 6 wherein the business capability type performed by one of said sets of holons is World Wide Web services capability.

8. The method for modularizing the information technology structure of a business organization of claim 7 wherein the business capability type performed by another of said sets of holons is of the internal business organization type.

9. The method for modularizing the information technology structure of a business organization of claim 8 wherein the business capability type performed by another of said sets of holons is of the data processing organization type.

10. The method for modularizing the information technology structure of a business organization of claim 8 further including the step of visualizing the modularized information technology structure of said business organization on a display of said computer controlled system.

11. A computer program having code recorded on a computer readable medium in a computer controlled system for modularizing the information technology structure of a business organization into a structure of interchangeable holonic self-contained modules, with each module performing a set of related functions comprising:

means for providing a plurality of sets of self-controlling holons, each holon in each set performing a business capability of the same type as performed by the other holons in its respective set but each set of holons performing a different business capability type than the other sets of holons and each holon being interchangeable to perform its respective business capabilities in other information technology structures;

means for providing a plurality of integration holons, each integration holon respectively integrating the holons in one of said sets into a unitary overall business capability holon providing a coordinated overall business capability of one of said different types;

a holon directory listing available interchangeable holons and the respective business capability of each of said available holons; and means for registering an interchangeable holon in said directory.

12. The computer program for modularizing the information technology structure of a business organization of claim 11 wherein the business capability type performed by one of said sets of holons is World Wide Web services capability.

13. The computer program for modularizing the information technology structure of a business organization of clam 12 wherein the business capability type performed by another of said sets of holons is of the internal business organization type.

14. The computer program for modularizing the information technology structure of a business organization of claim 13 wherein the business capability type performed by another of said set of holons is of the data processing organization type.

15. The computer program for modularizing the information technology structure of a business organization of claim 14 further including means for visualizing the modularized information technology structure of said business organization on a display of said computer controlled system.

* * * * *